United States Patent
Blanco et al.

(10) Patent No.: US 9,542,906 B2
(45) Date of Patent: Jan. 10, 2017

(54) SHARED COMPOSITIONAL RESOURCES

(71) Applicant: Microsoft Corporation, Redmond, WA (US)

(72) Inventors: Leonardo E Blanco, Redmond, WA (US); Reiner Fink, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 13/891,598

(22) Filed: May 10, 2013

(65) Prior Publication Data

US 2014/0333637 A1 Nov. 13, 2014

(51) Int. Cl.
*G06T 1/20* (2006.01)
*G09G 5/00* (2006.01)
*G06T 15/00* (2011.01)
*G06F 9/44* (2006.01)

(52) U.S. Cl.
CPC ............ *G09G 5/006* (2013.01); *G06F 9/4443* (2013.01); *G06T 1/20* (2013.01); *G06T 15/005* (2013.01)

(58) Field of Classification Search
None
See application file for complete search history.

(56) References Cited

U.S. PATENT DOCUMENTS

| | | |
|---|---|---|
| 5,745,095 A | 4/1998 | Parchem et al. |
| 6,172,684 B1 | 1/2001 | Lapidous |
| 6,418,542 B1 | 7/2002 | Yeager |
| 6,697,063 B1 | 2/2004 | Zhu |
| 6,961,065 B2 | 11/2005 | Sasaki |
| 7,012,606 B2 | 3/2006 | Swedberg et al. |
| 7,133,041 B2 | 11/2006 | Kaufman et al. |
| 7,154,503 B2 | 12/2006 | Yuan |
| 7,168,048 B1 | 1/2007 | Goossen et al. |

(Continued)

FOREIGN PATENT DOCUMENTS

| | | |
|---|---|---|
| CN | 1886779 A | 12/2006 |
| JP | 2007510202 A | 4/2007 |

(Continued)

OTHER PUBLICATIONS

Non-Final Office Action, U.S. Appl. No. 13/152,133, Oct. 1, 2014, 14 pages.

(Continued)

*Primary Examiner* — Joni Richer
(74) *Attorney, Agent, or Firm* — Tim Churna; Dan Choi; Micky Minhas

(57) ABSTRACT

Shared compositional resources are described. In one or more implementations, a global composition system may be configured to perform rendering for a plurality of processes, e.g., applications. For example, the global composition system may be configured to expose one or more application programming interfaces (APIs) that are accessible to the processes. The APIs may then be used to cause a single composition engine to perform the rendering for the plurality of applications. Thus, the single composition engine may be leveraged to support a variety of functionality, such as to manage sharing of compositional resources by a plurality of processes. This sharing may be performed in a variety of ways, which may include use of a writer/reader paradigm.

17 Claims, 8 Drawing Sheets

(56) References Cited

U.S. PATENT DOCUMENTS

| | | | |
|---|---|---|---|
| 7,443,401 B2 | 10/2008 | Blanco et al. | |
| 7,450,130 B2 | 11/2008 | Swedberg et al. | |
| 7,548,237 B2 | 6/2009 | David et al. | |
| 7,609,280 B2 | 10/2009 | Subramanian et al. | |
| 7,681,143 B2 | 3/2010 | Lindsay et al. | |
| 7,839,410 B1 | 11/2010 | Brown et al. | |
| 7,839,419 B2 | 11/2010 | Hanggie et al. | |
| 7,847,755 B1 | 12/2010 | Hardebeck et al. | |
| 7,949,955 B2 | 5/2011 | Winser et al. | |
| 8,248,412 B2 | 8/2012 | Fowler et al. | |
| 8,875,011 B2* | 10/2014 | Sitrick | G06F 17/00 715/230 |
| 2003/0076328 A1* | 4/2003 | Beda et al. | 345/503 |
| 2003/0078956 A1 | 4/2003 | Ravichandran et al. | |
| 2003/0208744 A1 | 11/2003 | Amir et al. | |
| 2003/0210267 A1 | 11/2003 | Kylberg et al. | |
| 2004/0222992 A1 | 11/2004 | Calkins et al. | |
| 2005/0088436 A1 | 4/2005 | Swedberg et al. | |
| 2005/0088447 A1 | 4/2005 | Hanggie | |
| 2005/0140692 A1 | 6/2005 | Swedberg et al. | |
| 2005/0168471 A1 | 8/2005 | Paquette | |
| 2005/0219258 A1 | 10/2005 | Stokes et al. | |
| 2006/0050078 A1 | 3/2006 | Monahan | |
| 2006/0061591 A1 | 3/2006 | Anderson | |
| 2006/0195520 A1 | 8/2006 | Stevens et al. | |
| 2007/0013723 A1 | 1/2007 | Souza et al. | |
| 2007/0052723 A1 | 3/2007 | Subramanian et al. | |
| 2007/0061733 A1 | 3/2007 | Schechter | |
| 2007/0079244 A1* | 4/2007 | Brugiolo | G06F 9/4445 715/740 |
| 2008/0120626 A1* | 5/2008 | Graffagnino | G06F 17/2205 719/320 |
| 2008/0303835 A1 | 12/2008 | Swift et al. | |
| 2009/0172245 A1 | 7/2009 | Dunstan | |
| 2009/0287824 A1 | 11/2009 | Fisher et al. | |
| 2010/0289804 A1 | 11/2010 | Jackman et al. | |
| 2011/0080416 A1 | 4/2011 | Duluk, Jr. et al. | |
| 2012/0042275 A1* | 2/2012 | Neerudu | G06F 3/1454 715/781 |
| 2012/0306912 A1 | 12/2012 | Blanco et al. | |
| 2013/0063445 A1 | 3/2013 | Blanco et al. | |
| 2013/0063459 A1 | 3/2013 | Schneider et al. | |
| 2013/0063464 A1 | 3/2013 | Schneider et al. | |
| 2013/0063482 A1 | 3/2013 | Moncayo et al. | |
| 2014/0344729 A1 | 11/2014 | Blanco et al. | |
| 2015/0334908 P1 | 11/2015 | Miller | |

FOREIGN PATENT DOCUMENTS

| | | |
|---|---|---|
| JP | 2007510976 A | 4/2007 |
| JP | 2009507306 A | 2/2009 |
| WO | WO 2005045736 | 5/2005 |
| WO | WO 2007032846 | 3/2007 |
| WO | WO 2011060442 | 5/2011 |
| WO | 2012/166189 A1 | 12/2012 |

OTHER PUBLICATIONS

Extended European Search Report, EP Application No. 11866466.3, Jan. 8, 2015, 13 pages.

Foreign Office Action, EP Application No. 11866466.3, Jan. 27, 2015, 1 Page.

Non-Final Office Action, U.S. Appl. No. 13/895,239, Jan. 20, 2015, 28 pages.

International Search Report & Written Opinion for PCT Patent Application No. PCT/US2013/060775, Mailed Date: Jan. 9, 2014, Filed Date: Sep. 20, 2013, 8 Pages.

"Resource Manager Class", Retrieved at <<http://msdn.microsoft.com/en-us/library/system.resources.resourcemanager.aspx>>, Retrieved Date: Apr. 12, 2013, pp. 28.

"DCompositionCreateSurfaceHandle Function", Retrieved at <<http://msdn.microsoft.com/en-us/library/windows/desktop/hh437360(v=vs.85).aspx>>, Retrieved Date: Apr. 11, 2013, pp. 3.

"Why Use DirectComposition?", Retrieved at <<http://msdn.microsoft.com/en-us/library/windows/desktop/hh449195(v=vs.85).aspx>>, May 25, 2012, pp. 2.

"Basic Concepts", Retrieved at <<http://msdn.microsoft.com/en-us/library/windows/desktop/hh437351(v=vs.85).aspx>>, Sep. 14, 2012, pp. 10.

Tonouchi, et al., "Creating Visual Objects by Direct Manipulation", Retrieved at <<http://pdf.aminer.org/000/641/485/creating_visual_objects_by_direct_manipulation.pdf>>, in IEEE Workshop on Visual Languages, Sep. 15, 1992, pp. 7.

"Architecture and Components", Retrieved at <<http://msdn.microsoft.com/en-us/library/windows/desktop/hh437350(v=vs.85).aspx>>, Sep. 14, 2012, pp. 6.

"WPF Graphics Rendering Overview", Retrieved at <<http://msdn.microsoft.com/en-us/library/ms748373.aspx>>, Retrieved Date: Apr. 11, 2013, pp. 20.

International Search Report and Written Opinion, International Application No. PCT/US2011/055531, (May 22, 2012), 10 pages.

Non-Final Office Action, U.S. Appl. No. 13/152,133, (Apr. 15, 2013),13 pages.

Boudon, et al., "A Survey of Computer Representations of Trees for Realistic and Efficient Rendering", *Technical Report 2301, LIRIS*, No. 2301-2006, Available at <http://liris.cnrs.fr/Documents/Liris-2301.pdf>,(Feb. 2006), 20 pages.

Kobbelt, et al., "A Survey of Point-Based Techniques in Computer Graphics", *Computers and Graphics*, vol. 28, No. 6, (Jul. 12, 2004), 23 pages.

Piringer, Harald et al., "A Multi-Threading Architecture to Support Interactive Visual Exploration", *IEEE Transactions on Visualization and Computer Graphics*, vol. 15, Issue 6, Available at <http://www.informatik.uni-rostock.de/~ct/pub_files/Piringer09MultiThreading.pdf>,(Nov. 2009), 8 pages.

Stoyanov, Stanimir "The Desktop Window Manager API", Retrieved from: <http://www.stoyanoff.info/blog/projects-and-researches/dwm-api-overview/> on,(Jul. 26, 2006), 3 pages.

Final Office Action, U.S. Appl. No. 13/152,133, Nov. 14, 2013, 14 pages.

Humphreys, et al., "Chromium: A Stream-Processing Framework for Interactive Rendering on Clusters", ACM Transactions on Graphics (TOG), vol. 21 Issue 3, Jul. 2002, pp. 693-702.

".NET Framework version history—Wikepedia the free encyclopedia", Retrieved at: http://en.wikipedia.org/wiki/.NET_Framework_version_history, Mar. 24, 2015, 11 pages.

"Windows Presentation Foundation—Wikipedia, the free encyclopedia", Retrieved at: http://en.wikipedia.org/wiki/Windows_Presentation_Foundation, May 12, 2013, 12 pages.

Final Office Action, U.S. Appl. No. 13/152,133, Jun. 19, 2015, 15 pages.

International Search Report and Written Opinion, Application No. PCT/US2013/060776, Apr. 2, 2015, 16 Pages.

Final Office Action, U.S. Appl. No. 13/895,239, Jun. 19, 2015, 26 pages.

"Shapes and Basic Drawing in WPF Overview", Retrieved at: https://msdn.microsoft.com/en-us/library/ms747393%28v=vs.110%29.aspx, Aug. 15, 2012, 8 pages.

"Painting with Solid Colors and Gradients Overview", Retrieved at: https://msdn.microsoft.com/en-us/library/ms754083%28v=vs.110%29.aspx, Aug. 15, 2012, 9 pages.

U.S. Appl. No. 13/152,133, Amendment dated Aug. 13, 2013, 13 pages.

U.S. Appl. No. 13/152,133, Amendment dated Apr. 8, 2014, 15 pages.

U.S. Appl. No. 13/152,133, Amendment dated Feb. 10, 2015, 17 pages.

U.S. Appl. No. 13/152,133, Amendment dated Sep. 16, 2015, 18 pages.

European Patent Application No. 11 866 466.3, Communication dated Aug. 6, 2015, 14 pages.

Japanese Patent Application No. 2014-513493, Office Action dated Sep. 29, 2015, 10 pages (including English translation).

U.S. Appl. No. 13/895,239, Amendment dated Feb. 24, 2015, 15 pages.

(56) References Cited

OTHER PUBLICATIONS

U.S. Appl. No. 13/895,239, Amendment dated Sep. 16, 2915, 15 pages.
PCT Application No. PCT/US2013/060776, PCT Chapter II Demand and Letter accompanying amendments under Article 34 PCT, dated Jun. 16, 2015, 15 pages.
Chinese Patent Application No. 201180071359.2, Office Action dated Feb. 3, 2016, 8 pages.
Japanese Patent Application No. 2014-513493, Amendment dated Dec. 24, 2015, 10 pages (including English translation of summary of arguments and claims).
U.S. Appl. No. 13/152,133, Advisory Action dated Nov. 30, 2015, 6 pages.
U.S. Appl. No. 13/152,133, Amendment dated Dec. 17, 2015, 21 pages.
U.S. Appl. No. 13/152,133, Notice of Allowance dated Feb. 1, 2016, 8 pages.
European Patent Application No. 13773982.7, Communication dated Dec. 15, 2015, 2 pages.
European Patent Application No. 13773982.7, Response to Communication, dated Jan. 11, 2016, 13 pages.
European Patent Application No. 13771317.8, Communication dated Dec. 17, 2015, 2 pages.
U.S. Appl. No. 13/895,239, Amendment dated Feb. 25, 2016, 15 pages.
PCT Application No. PCT/US2014/063616, Second Written Opinion, mailed Sep. 29, 2015, 4 pages.
U.S. Appl. No. 13/895,239, Office Action dated Nov. 27, 2015. 26 pages.
European Patent Application No. 11 866 466.03, Amendment dated Aug. 6, 2016, 14 pages.
U.S. Appl. No. 13/895,239, Final Office Action dated Apr. 19, 2016, 27 pages.
U.S. Appl. No. 13/895,239, Amendment After Final Office Action, Jul. 1, 2016, 16 pages.
Japanese Patent Application 2014-513493, Office Action dated Apr. 26, 2016, 6 pages (including English translation).
European Patent Application No. 13771317.8, Amendment dated Jun. 23, 2016, 8 pages.
Chinese Patent Application No. 2011800713592, Amendment dated Jun. 20, 2016, 9 pages (including English translation of claims).

\* cited by examiner

SHARED COMPOSITIONAL RESOURCES

BACKGROUND

A wide variety of elements may be rendered on a computing device, such as icons, windows, animations, and so on. Further, the numbers of applications typically executed on the computing device continues to increase as well as the number of elements each of the applications typically provides, such as to provide additional functionality and a richer user experience.

However, this increase in elements may consume a significant amount of resources of the computing device, such as processor, memory, graphics hardware, and other resources. Accordingly, this consumption may also have an effect on execution of the applications themselves, responsiveness of the computing device to a user, and so on.

SUMMARY

Shared compositional resources are described. In one or more implementations, a global composition system may be configured to perform rendering for a plurality of processes, e.g., applications. For example, the global composition system may be configured to expose one or more application programming interfaces (APIs) that are accessible to the processes. The APIs may then be used to cause a single composition engine to perform the rendering for the plurality of applications. Thus, the single composition engine may be leveraged to support a variety of functionality, such as to manage sharing of compositional resources by a plurality of processes. This sharing may be performed in a variety of ways, which may include use of a writer/reader paradigm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
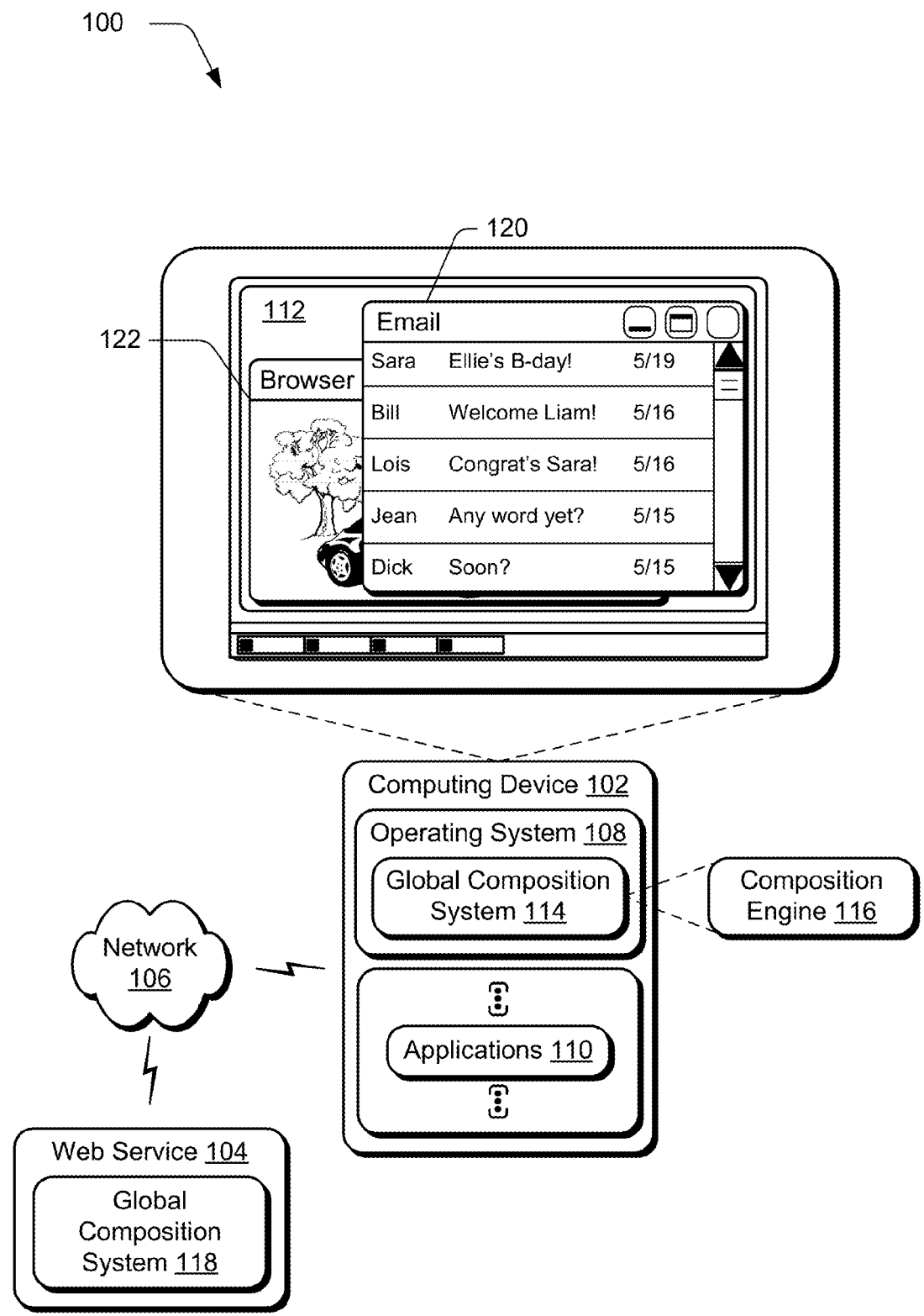
FIG. 1 is an illustration of an environment in an example implementation that is operable to implement a global composition system.

Conventional techniques used to render elements by a computing device employed a distributed system in which each process was assigned a corresponding composition engine. Because of this, the different composition engines were unaware of what was being performed by other composition engines. This could lead to redundancies, unnecessary rending of elements, and so on that could hinder the efficiency of a computing device that implemented the conventional techniques and thus could make these conventional techniques ill suited for use by "thin" computing devices.

Global composition techniques and shared compositional resources are described herein. These techniques include use of a single composition engine that is accessible by a plurality of different processes via one or more APIs. Thus, the composition engine may be made "aware" of what is being contributed by the various processes and how those elements relate. This knowledge may then be leveraged to improve efficiency in the rendering of elements of the applications. In one or more implementations, the composition engine runs asynchronous from threads belonging to those applications, which allows applications to cause content to be animated within their windows and use disparate rendering technologies to rasterize such content. Additionally, composition data from each process in the system may be managed in a single graph (e.g., a global composition tree) which allows the composition engine to perform global optimizations such as occlusion detection, as well as to mix and match content from multiple process in an efficient and secure fashion.

This may also be leveraged to share compositional resources between processes. For example, a first process may create a compositional resource that may be shared with a second process, such as a float, color, animation trigger, transform, visual, or other visual property. In this way, different processes may share compositional resources. For example, a writer/reader paradigm may then implemented by the composition engine in which a writer process has permission to modify properties of the shared compositional resources whereas a reader process has permission to specify an element to be rendered. In this way, the reader process may specify "what" element is to be rendered and the writer process may specify "how" the element is to be rendered without either of the processes being aware of what was specified by the other process. In this way, execution of each process may be abstracted from the execution of the other processes yet permit sharing of compositional resources. Further discussion of these and other techniques may be found in relation to the following figures.

In the following discussion, an Example Composition Environment is first described that may employ the techniques described herein. A Shared Compositional Resource section follows that describe sharing of compositional resources between processes, which may be implemented in the Example Composition System as well as other systems. Example procedures are then described which may be performed in the example environment as well as other environments. Consequently, performance of the example procedures, sharing of compositional resources, and the example environment are not to be limited to each of the other described implementation, those implementation being examples of a plurality of different implementations that may leverage the techniques described herein.

Example Composition Environment

FIG. 1 is an illustration of an environment 100 in an example implementation that is operable to employ techniques described herein. The illustrated environment 100 includes a computing device 102 that is communicatively coupled to a web service 104 via a network 106. The computing device 102 as well as computing devices that may implement the web service 104 may be configured in a variety of ways.

For example, a computing device may be configured as a computer that is capable of communicating over the network 106, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by the web service 104, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 102 is further illustrated as including an operating system 108. The operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 (which may include single or multiple processes) may be written without knowing "how" this underlying functionality is implemented. The application 110, for instance, may provide data to the operating system 108 to be rendered and displayed by the display device 112 without understanding how this rendering will be performed.

The operating system 108 may also represent a variety of other functionality, such as to manage a file system and user interface that is navigable by a user of the computing device 102. An example of this is illustrated as a desktop that is displayed on the display device 112 of the computing device 102.

The operating system 108 is also illustrated as including a global composition system 114. The global composition system 114 may represent a system that includes a direct composition component that is configured to allow applications 110 to use a single composition engine 116 (hereinafter also referred to as a global composition engine 116) to draw items on the display device 112. Although illustrated as part of an operating system 108, the global composition system 114 may be implemented in a variety of other ways, such as part of a browser, as a stand-alone module, and so forth. Further, the global composition system 114 may be distributed across the network 106, an example of which is illustrated as inclusion of a global composition system 118 on the web service 104.

User experiences (e.g., user interfaces generated for applications 110) may include a signification number of elements that may interact with each other, such as windows, animations (e.g., text scrolling), and so on. For example, a first window may correspond to an email application and a second window 122 may correspond to a browser as illustrated on the display device 112. Thus, a multitude of different rendering components may be involved at any one particular point in time. Additionally, these different elements may have different refresh rates, such as an animation of a "ticker" display along with video and static text.

The global composition system 114 may be utilized to abstract this functionality such that different applications 110 may offload this rendering and thus be unaware of how the rendering is performed. For example, applications 110 (which are examples of processes in this discussion) may provide data that describe elements to be rendered, placement of the elements, and how the elements interrelate with each other.

Additionally, the global composition system 114 may support "independent" animation. An application 110, for instance, may communicate a declaration description of an animation that describes how an animation is to be rendered. For example, the description may describe what is being animated, a rate at which redraws are to occur, a location at which the animation is to begin, a curve over which the animation is to move, an ending location of the animation, an amount of time the animation is to be rendered, and so forth.

This rendering may then be performed by the global composition system 114 and continue without further instruction. In this way, the rendering of the animation is independent of the caller (e.g., the application 110), such that loss of communication with the application 110, inconsistent processing of the application 110, and so on does not have an effect on the rendering of the animation. Thereby, this may be used to improve "smoothness" and "fluidity" of the animation as well as resources of the computing device 102 (and even network 106 are further described below) by cutting down on the number of communications by the application 110 to render the animation.

Conventionally, each of the applications 110 that were executed by a computing device 102 interacted with a corresponding composition engine to perform the processing and rendering of a display for the respective application. Therefore, conventional composition engines were often implemented "per process." Accordingly, conventional techniques may involve execution of a plurality of different composition engines at any one time. Additionally, conventional composition engines were typically "not aware" of the rendering performed by other composition engines. This could result in inefficient use of resources of the computing device 102, such as to draw a window even though it may be occluded by another window which could result in unnecessary use of processor, graphical processor, memory, and other resources of the computing device 102.

In one or more implementations, the global composition system 114 follows a global architecture such that a plurality of applications 110 may access the composition engine 116, e.g., via an application programming interface. For example, a single composition engine 116 may be responsible for an entire desktop and elements from applications 110 that are currently being executed. Thus, the single composition engine 116 may be "aware" of the different elements that are to be rendered for the plurality of applications and react accordingly as well as manage interaction of the processes with each other, such as to support shared compositional resources as further described below in a corresponding section.

Continuing with the previous example, the composition engine 116 may be aware that an element of an application (e.g., a window) is to be occluded by an element to be rendered for another application, e.g., another window. As shown in FIG. 1, for instance, the application may have a window that is to be displayed behind the window 120 that corresponds to the email application. Previously, even though the corresponding window of the application was not viewable to a user of the computing device 102, the window was still rendered. However, the composition engine 116 may use the present techniques to skip the rendering of the occluded window, thereby conserving resources of the computing device 102 and thus supporting use on "thin" computing devices.

The global composition system 114 may be used to provide a wide variety of functionality. As previously described, the global composition system 114 may perform global analysis of what is to be rendered by the plurality of applications 110 and efficiently determine which of the elements are to be drawn, such as in the case of occlusion in which rendering of elements may be skipped as previously described. Additionally, resources may be pooled by the global composition system 114, such as to share intermediate memory by a plurality of applications 110 instead of fragmented memory as could be consumed by conventional composition engines both by the engines themselves as well as what is being drawn by the engines.

The global composition system 114 may also support security techniques. For example, the global composition system 114 may be employed to draw protected video, such as encrypted movies and corresponding licensing. For conventional composition engines, the application composes the content and then transfers the content to a corresponding composition engine. This may result in the content being "transferred in the clear" (e.g., transfer of uncompressed video frames) without the protections and thus the content could be exposed to malicious parties.

However, in one or more implementations described herein the content may be provided to the global composition system 114 and may execute within a protected area that is not touchable directly by the applications 110. Thus, trust of the composition engine 116 to not further communicate the content may be used to protect that content. For instance, the composition engine may be relied upon to generate pixels for rendering without exposing those pixels to applications that are executed by the computing device 102. Thus, this "one way flow" may help ensure that the wrong application (e.g., from a malicious entity) does not receive the unprotected content.

Further, conventional composition engines and corresponding applications "owned" a particular portion of a screen of a display device 112. Therefore, some display techniques were difficult to support using these conventional techniques. One such technique was transparency for multiple applications because the area of the display device 112 could be owned by one or the other conventional composition engines, but not both. For instance, a particular area of the display device 112 may involve windows from at least two different applications and their corresponding conventional composition engines. Conventionally, to support techniques such as transparency each instance of the windows was drawn to memory and then effects were applied to the combination, which was resource intensive.

However, because the global composition system 114 may be aware of the different windows and react accordingly, the desired result may be achieved without drawing the windows separately to memory beforehand and then applying the visual effects to the windows. For example, the global composition system 114 may utilize a single hierarchical tree that describes elements to be rendered and thus "know" how the elements relate. Therefore, the global composition system 114 may draw directly to memory of the computing device 102 without the intermediate steps that were performed using conventional techniques. Thus, these techniques may be employed by "thin" computing devices that could not employ conventional composition engines due to memory and/or processing limitations.

Additionally, conventional composition engines were generally executed asynchronously to support different rendering rates by different applications. Although this did support functionality such that rendering specified an application associated with one composition did not affect the rendering specified by another application, this could result in an inefficient use of computing device 102 resources.

Further, priorities assigned to the different conventional composition engines may cause errors both to the conventional composition engine as well as associated application. For instance, conventional composition engines may be given a relatively high priority for execution by a processor of the computing device 102. However, instances may occur in which the composition engines consume a signification amount of the resources, such as to support multiple animations. Because of this, the composition engines as well as the applications themselves may not have sufficient resources available to execute as intended when confronted with such resource intensive tasks.

In one or more implementations, the composition engine 116 may be assigned a high priority, e.g., a high thread priority may be assigned to the composition engine 116 relative to priorities assigned to other threads executed by the computing device 102. The global composition engine 114 may then mange priority of how elements from the different sources are rendered by the composition engine 116, which is given a high priority to ensure that the rendering occurs. For example, the global composition system 114 may manage which elements are updated, a frequency at which this update occurs (e.g., to switch from 60 Hz to 30 Hz), and so on. Thus, the global composition system 114 may help promote availability of resources of the computing device 102 for other uses, such as the applications 110 that provide the elements for rendering.

Figure 2:
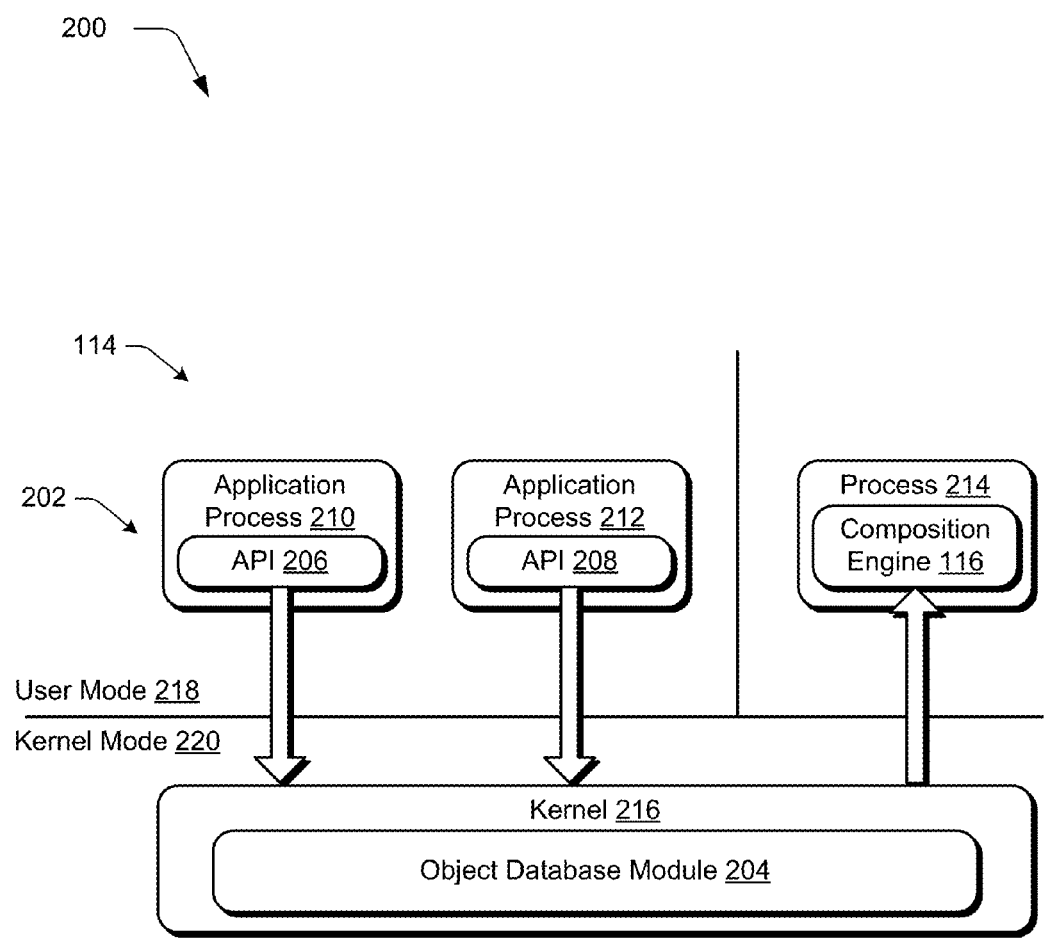
FIG. 2 illustrates an example system in which the global composition system is illustrated in greater detail as including a composition engine of FIG. 1 as well as a user-mode library and object database module.

FIG. 2 illustrates an example system 200 in which the global composition system 114 is illustrated in greater detail as including the composition engine 116 of FIG. 1 as well as a user-mode library 202 and an object database module 204. The user-mode library 202 supports a variety of APIs 206, 208 that are illustrated as being used by respective application processes 210, 212 to interact with the object database module 204 and the composition engine 116. The processes 210, 212 may correspond to a single application, multiple applications, and so on. The composition engine 116 is illustrated in this example system 200 as being executed within its own process 214.

Conventional use of a plurality of distributed composition engines protected execution of the engines as well as applications of a computing device from each other. For example, if a first application fails, a first conventional composition engine coupled to the first application may also fail. However, a second composition engine that was coupled to a different conventional composition engine was protected by the failure due to the lack of "knowledge" that the conventional composition engines had of each other.

In one or more implementations, the global composition system 114 may employ techniques to protect against corruption of state of the composition engine 116 by applications 110 that provide elements for rendering. One such technique is to employ the composition engine 116 within a kernel 216 of the operating system 108. Thus, the composition engine 116 may "trust" other components that are also executed in the kernel 216.

In this way, the global composition system 114 may employ a "trust boundary" between a user mode 218 and a kernel mode 220 such that checks are performed by the kernel. In one or more implementations, applications may be relied upon to determine "correctness" provided by the applications such as parameter checking to improve efficiency of processing done by the global composition system 114.

Another such technique involves tracking such that the global composition system 114 "knows" which data (e.g., elements for rendering) belongs to which application. Therefore, a failure of one application (e.g., a crash) does not affect the elements of another application. Further, the global composition system 114 may "clean up" the elements in case of such failure, such as to remove the elements from being rendered after a predetermined amount of time. In this way, the global composition system 114 may allow an application to fail gracefully and not affect other applications and corresponding elements to be rendered.

As illustrated the composition engine 116 is executed on a dedicated system process 214, which is different than processes used to execute other code such as other application processes 210, 212 of the computing device 102. Additionally, this process 214 may be assigned high levels of trust and priority. This process 214, for instance, may be trusted from a point of viewing of getting composition data and thus may be used for protected data, such as protected video data, email protected with rights management, and so on.

As illustrated in FIG. 2, the global composition system 114 may be implemented using three parts. A first part is illustrated as the composition engine 116, which is representative of functionality to perform the rendering, i.e., "do the drawing" to the display device 112. A second part is illustrated as a user-mode library 202, which is representative of an entity that is called by the applications by exposing application programming interfaces (API) 206, 208. For example, the user-mode library 202 may act as a "mail slot" to receive composition data from the applications, such as through use of a dynamic linked library (DLL).

A third part is illustrated as an object database module 204 that is illustrated as residing in the kernel 216. The object database module 204 is representative of functionality that is responsible for moving data between the user-mode library 202 and the composition engine 116.

The object database module 204 may also perform validation. For example, an application may call the user-mode library 202 to create an element, such as a bitmap. If the requested element does not meet criteria that are enforced by the object database module 204 (e.g., less than "N" number of pixels), the object database module 204 may return a failure message to the application that called the user-mode library 202. Thus, the object database module 204 may operate within the kernel 216 to control what is provided to the composition engine 116. A variety of other policies may be enforced by the object database module 204.

Therefore, the composition engine 116 may rely on data that is provided by the object database module 204 as complying with policies implemented by the object database module 204. In other words, the composition engine may assume that the data is valid and correct and thus suitable for rendering. Consequently, the validation may be performed a single time by the object database module 204 and then utilized by the composition engine 116 to perform the rendering without further validation.

Figure 3:
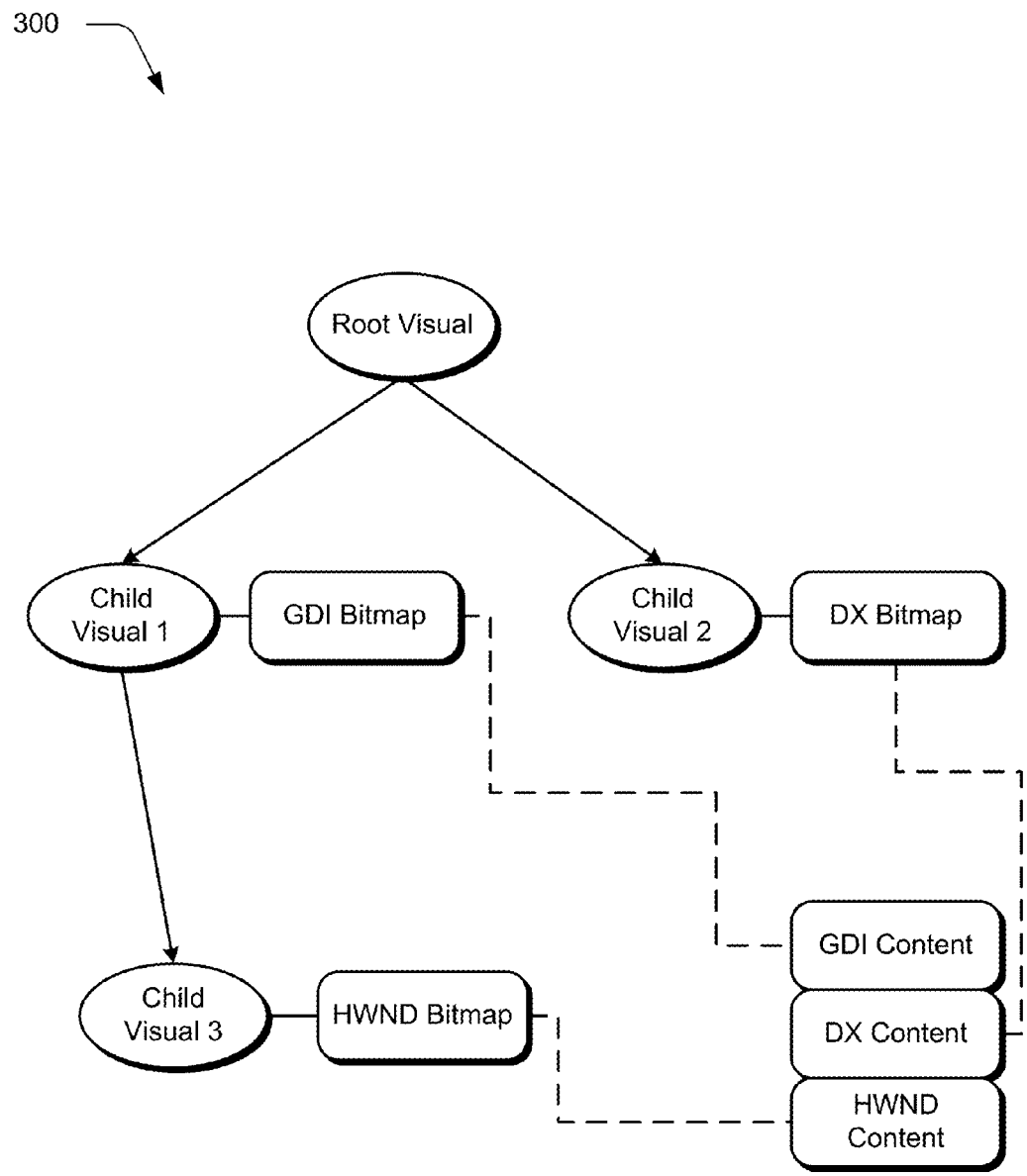
FIG. 3 depicts an example of a graph configured as a global composition tree that is consumable by a composition engine to render elements.

The object database module 204 may also be representative of functionality to inform the composition engine 116 of when data to be rendered has changed. For example, an API implemented via the user-mode library may be configured to consume a graph that describes what is to be rendered, an example of which is shown in FIG. 3. The graph 300 may include a list of elements to be rendered as well as a description of where to render the elements on the display device 112, which may include how the elements are to move in an instance of an animation.

Additionally, the elements to be rendered may be formed using sub-elements and thus the graph 300 may assume a hierarchical structure. Further, the graph 300 may describe how the elements are to be rendered, e.g., draw text once, render an animation at 60 Hz, and so forth. Thus, the graph 300 may describe the elements and how the elements relate to each other.

The graph 300 represents two sets of objects that may be used by the composition engine 116 to render a scene, bitmaps that are composed together and visuals that define the spatial relationships according to which those bitmaps are composed. In this model, the bitmaps are the "what" and the visuals are the "how" of the composition engine 116. Those objects are arranged in a tree structure and bound to a top-level or child window for composition.

Returning again to FIG. 2, once received by the composition engine 116, the application does not need to further call the composition engine 116 to keep rendering the elements. Thus, the composition engine 116 may conserve resources as compared to conventional techniques that could involve an application making sixty calls per second to render an animation at a refresh rate of the display device 112. Thus, the application 110 may call an API of the user-mode library 202 to construct a structure and an API to construct elements to be rendered by the composition engine.

In order to make a change to the content that is rendered by the composition engine 116, the application may call another application programming interface of the user-mode library 202 to update the structure and/or elements. For example, the application may provide data via an update API to provide information to be used for a stock ticker animation.

In one or more implementations, batching techniques may also be leveraged to define which elements are to be rendered using frames. As previously described, the global composition system 114 may receive a variety of different elements for rendering at a variety of different rates. Accordingly, the global composition system 114 may support a structure in which a list of elements to be rendered together is formed. Thus, the global composition system 114 may implement a definition of begin and end for the elements in which the elements received in between are not rendered until the "end" is received. Thus, the frame may support an "all or nothing" approach to the rendering of elements for particular frames and ensure that the elements are rendered together for display when desired.

For example, the object database module 204 may track two different states for an application. The first state may reference elements that are for current display. The second state may reference elements that are to be displayed subsequent to the first state and that are changed. Thus, the second state may be used to build a list of elements for rendering by the composition engine 116 once the list is completed, e.g., once an indication is received from the application that the list is complete.

Once complete, the changes may be sent to the composition engine 116. Further, the timing of the receipt of the indication from the application that the list is complete may be used to determine when those changes are displayed, e.g., which frame. Thus, the composition engine 116 may receive a batch of changes described in one or more lists that are completed but lists that have not been indicated as complete are not communicated. This batching may thus define frames that are rendered by the composition engine 116. Further, this may help limit display of erroneous visual artifacts as could occur using conventional techniques that did not support such a definition. As should be readily apparent, an amount of time that corresponds to the frames may be set for a variety of different amounts as desired.

Thus, the object database module 204 may remember what was previously rendered by the composition engine 116 (e.g., elements and properties of those elements), as well as know what is going to be rendered. Therefore, the object database module 204 may determine which elements are changed by comparing this information. Accordingly, the object database module 204 may communicate information which describes this change without communicating information that is not changed to the composition engine 116.

Additionally, the use of frames may further improve efficiency. For example, an application may communicate data that describes that an object is to be moved a certain distance and return back to an original position. The object database module 204 may determine that this movement is to occur within a time period of a single frame. Accordingly, the object database module 204 may refrain from communicating this data to the composition engine 116 and rather have the object remain at its previous state. For instance, this movement may occur within a time period used to refresh a display device 112 and thus would not be viewable by a user, regardless.

In this way, the object database module 204 may discard intermediate states in the construction of the list that is to be provided to the composition engine 116 for rendering. This list may then be communicated in a variety of ways, such as an array of commands to be performed by the composition engine 116 to implement the changes. Further, this technique may also be used to address instances of unbounded data sent by application because a single instance is reported to the composition engine.

The object database module 204 and the composition engine 116 may also employ acknowledgement techniques that describe that a change was implemented. For example, the composition engine 116 may receive a communication from the object database module 204 that describes a change to be made. While the change is being made, the object database module 204 may wait to send additional changes until an acknowledgement has been received that the previous change was made. Once the acknowledgment is received by the object database module 204, the additional changes may then be communicated to the composition engine.

Further, this technique may be used to provide "throttling" and thus further conserve resources of the computing device 102. For example, an application may make a number of requests that exceed the rate at which a display device is refreshed. By using the frames and batching the changes the amount of resources that would otherwise be consumed is reduced.

Applications that make changes to what is displayed by calling the API of the user-mode library 202 may be multithreaded. Accordingly, in one or more implementations the object database module 204 may employ techniques such that multiple calls from the multiple threads of a single application do not corrupt the state. This may be performed by the application locking its threads together, itself, e.g., one thread may be blocked while another thread of the application completes a task.

The changes from the multiple threads may then be stored in a queue which may be managed by the operating system 108, such as through interlocked access that may be employed for variables such that different threads may make "complete" changes before passing control to another thread. This may support the frame techniques described above to arrive at atomic units of work that are to be processed by the composition engine. Additionally, for frames in which updates are not received, execution of the composition engine may be paused until the next frame thereby further conserving resources of the computing device 102.

The kernel 216 may also add a variety of functionality in conjunction with the global composition system 114. For example, when an application fails (e.g., crashes) the kernel 216 may inform the composition engine 116 of this occurrence. The composition engine 116 may then perform techniques that are to similar to those that would be used if the application ceased execution "naturally" through a normal exit procedure. In this way, the composition engine 116 may "clean up" state such that the elements that correspond to the application are removed from display on the display device 112 of the computing device 102. Thus, this promotes robustness in the execution of the composition engine 116.

The execution of the composition engine 116 may also be secured by implementing a write-only API for the user-mode library 202. In this way, the composition engine 116 may generate the pixels but not expose those pixels back to the applications, thereby protecting the images from malicious parties.

As previously described, implementation of these techniques may also involve devices "outside" of the computing device 102, which may be distributed across one or more entities such as the web service 104. For example, these techniques may be employed to support terminal services, a remote desktop environment, and so on through communication of the batch of elements and properties (e.g., a composition tree such as a graph 300 of FIG. 3) via the network 106. Thus, the graph 300 may be generated elsewhere (e.g., through implementation of the user-mode library 202 and/or the object database module 204 on the web service 104) and transfer the composition tree for rendering by the composition engine 116 through execution of the computing device 102. In this way, the animations may be smoothly displayed even in instances in which the network 106 is unreliable. Further discussion of these and other techniques may be found in relation to the following section regarding shared compositional resources.

Shared Compositional Resources

Figure 4:
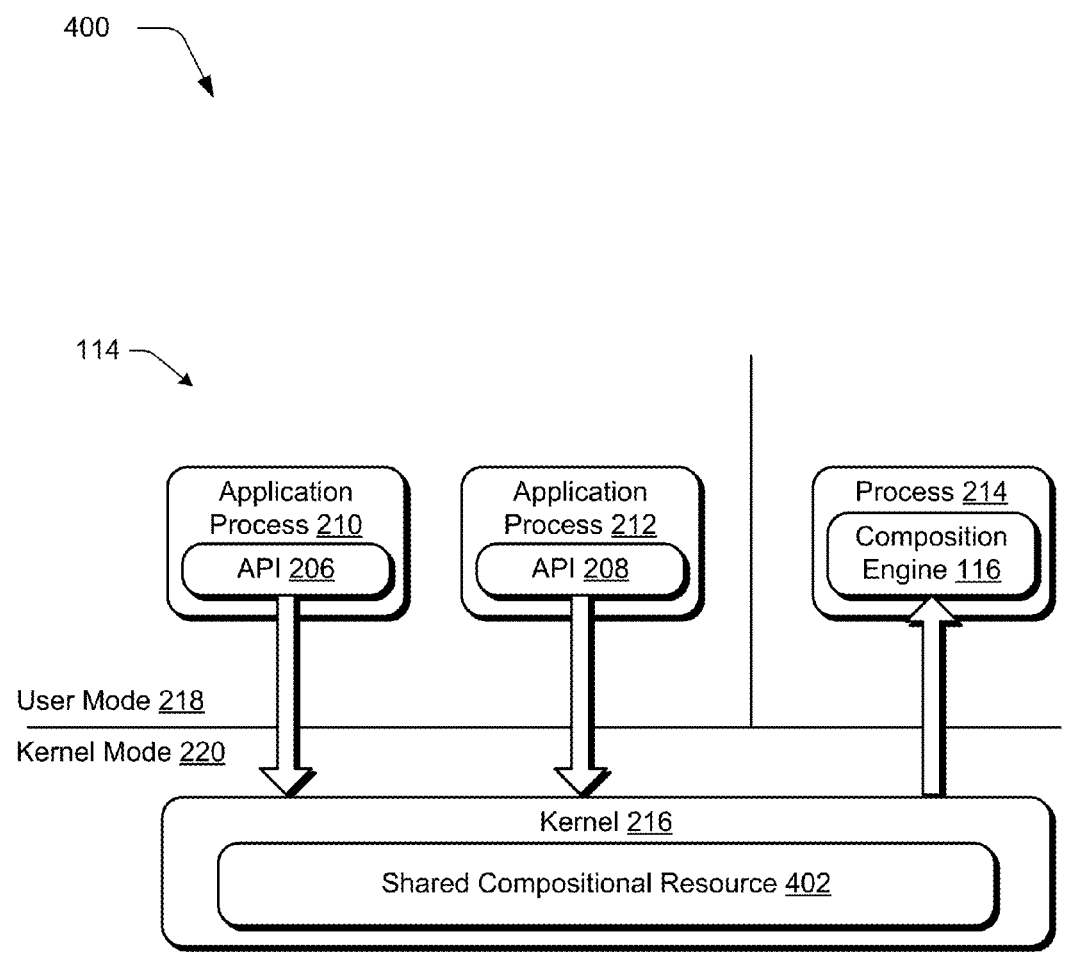
FIG. 4 illustrates an example system in which the global composition system is illustrated in greater detail as supporting a shared compositional resource.

FIG. 4 illustrates an example system 400 in which the global composition system 114 is illustrated in greater detail as supporting a shared compositional resource. As before, the global composition system 114 includes the composition engine 116 of FIG. 1. Application processes 210, 212 interact with a kernel 216 via a semantic model that includes APIs 206, 208 and handles that are used to access the composition engine 116 which is illustrated as being executed within its own process 214 and which may be used to abstract actual execution and implementation as further described below. The processes 210, 212 may correspond to a single application, multiple applications, and so on. The system 400 also includes the previous trust boundary implemented via the user and kernel modes 218, 220 although other examples are also contemplated.

Figure 5:
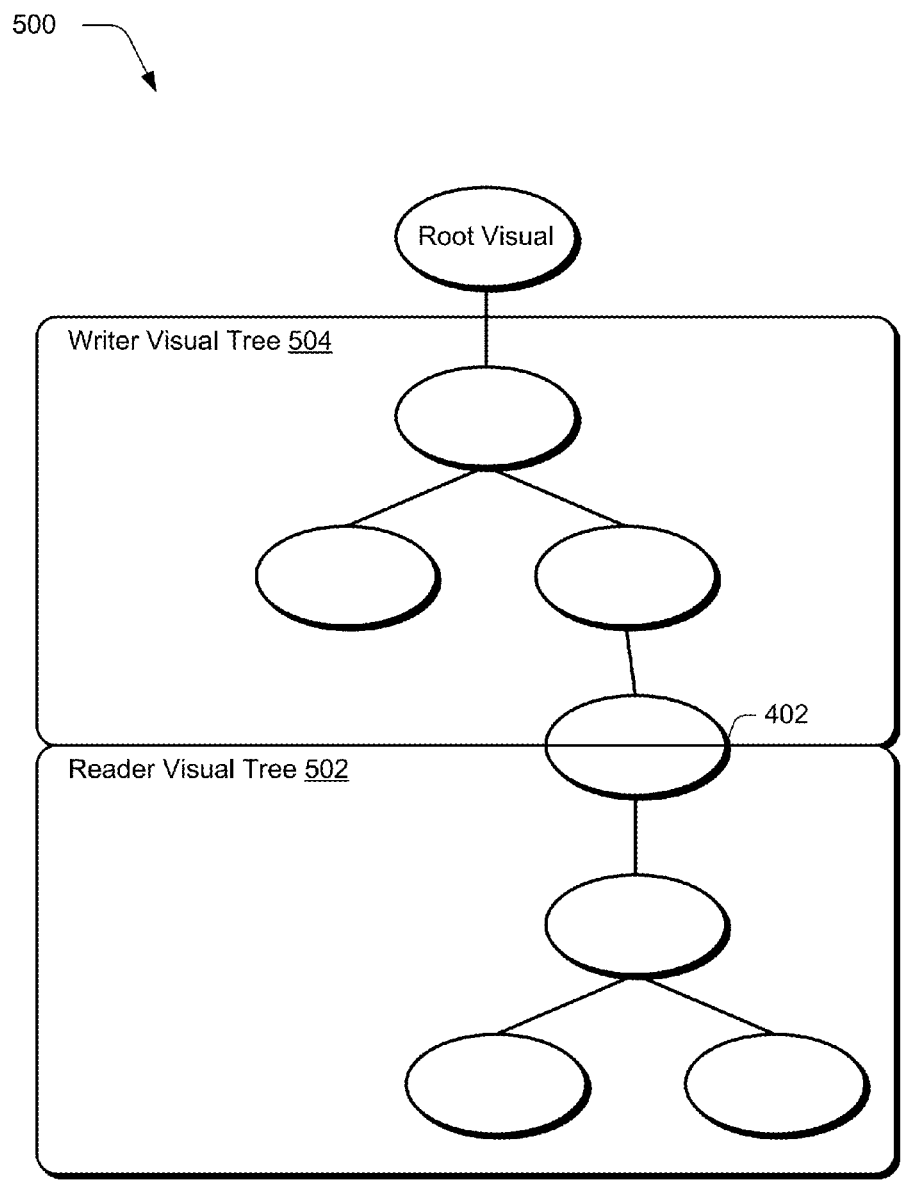
FIG. 5 depicts a graph configured as a composition tree that includes the sharable visual resource that is implemented for association by both writer and reader processes.

The composition engine 116 is this example is configured to support the ability to share the compositional resource 402 by the application processes 210, 212. The compositional resources may take a variety of forms, such as a float, color, animation trigger, transform, visual, usage pattern, or other visual property. This may be utilized to support a variety of different techniques involved in the rendering of elements for display on a display device, such as to support component hosting, sharing of visual resources to host one framework within another as shown in FIG. 5, and so on. This sharing may be implemented in a variety of ways, an example of which is described as follows and shown in a corresponding figure.

FIG. 5 depicts a graph 500 configured as a global composition tree that includes the sharable visual resource 402 that is implemented for association by both writer and reader processes. In this example, the composition engine 116 may implement a security model in which responsibilities of the processes are well defined (e.g., by a reader/writer paradigm) above as well as to manage access in the graph 500 based on which nodes correspond with which process. For instance, rather than have two separate frameworks implemented in separate composition trees, a reader visual tree 502 is hosted framework that is hosted by a writer visual tree 504 through use of the shared compositional resource 402. This enables the writer process (i.e., the host) to treat the entire hosted visual tree as single visual.

Thus, the writer process may apply each of the same properties to this hosted framework as it would to any visual in its tree, such as transforms, opacity, and so on. This also makes it possible for the framework to be positioned via composition properties (e.g., shared transforms) rather than operating system commands. Further, the composition engine 116 may be configured such that a process is limited to access of elements (e.g., nodes in the figure) that correspond to that process. For example, the reader process may be prevented from "walking" the writer visual tree 504 in the illustration and vice versa. In one or more implementations, a process that creates a shared compositional component has full rights to the component for modification purposes whereas a reader process sets a visual to be modified. Thus, a creator of the shared compositional resource 402 is configured as the writer (i.e., the hosting process) and a process that is given access to the created process is configured as the reader, although other examples are also contemplated.

The use of the shared compositional resource 402 may also support use of the separate frameworks represented by the reader and writer visual trees 502, 504 to be included in separate processes. For example, in conventional techniques the hosted process was conventionally forced to execute in the same process as its host. With the ability to have multiple processes in a hosting scenario, the host/hosted processes are able to create an additional security boundary for the hosted content.

Using the shared compositional resource to tie the two trees together also enables elements of the reader visual tree 504 to be implemented in the correct drawing order along with the rest of the elements in the writer visual tree 504. This means that the hosted framework of the reader visual tree 502 will no longer suffer from airspace issues as its content is no longer contained in a separate top level window. Airspace involves the inability for two components to be composed together, such that any given pixel on a display device is defined by the content of a single one of the components.

As shown in FIG. 5, the shared compositional resource 402 is illustrated as "split" between the reader and writer visual trees 502, 504 to indicate access to different functionality of the shared compositional resource 402 by the respective processes. For example, the composition engine 116 may be configured to support a writer/reader paradigm to enforce a security model for access to the shared compositional resource 402. A reader process, for instance, may be configured to specify what element is displayed as part of the shared compositional resource 402. The writer process, on the other hand, is configured to specify how the specified element of the shared compositional resource 402 is displayed.

In another example, as illustrated the shared compositional resource 402 is included in a graph 500, e.g., a compositional tree. The graph 500 is configured to follow a reader/writer paradigm managed by the composition engine 116 for access by the plurality of processes such that a reader process is configured to associate one or more child nodes that specify content to the shared compositional resource in the graph 500. The writer process is configured to modify one or more visual properties of the content but is not configured to add child nodes (i.e., elements) to the shared compositional resource 402. In the illustrated instance, the reader visual tree 502 of a reader process includes child nodes of the shared compositional resource, whereas the writer process is not configured to add child nodes. This security model may be used to support a variety of different functionality for a variety of different shared composition resources.

As previously described, the shared visual component 402 may be configured in a variety of ways, one example of which is a float. A writer process, for instance, may set and/or update a float value via an interface that is configured to set a shared float value as a static animation parameter, which may be used to drive dependent animations. A reader process, on the other hand, is not permitted to change the float value and may not even be aware of the value that is set by the writer process. A dependent animation is an animation that is defined by periodic calls from an application to one or more system APIs on a regular cadence with a variable value. Therefore, a dependent animation is maintained using constant involvement of the calling code, as opposed to those animations that are defined by one single call that describes the value of the animation over time into the future, which can be executed by the operating system without further involvement by the application.

The shared composition resource 402, for example, may be configured as a float that is configured to specify opacity of a visual, e.g., to set opacity to the specified float value. The writer process may create the shared compositional resource, i.e., the float, which is to be used to specify an amount of opacity. Therefore, opacity of an element of the shared resource 402 and child nodes are controlled by a writer process whereas content of the shared resource 402 and child nodes are specified by the reader process through interaction with the composition engine 116.

Further, the composition engine 116 may be configured to manage interaction with the shared compositional resource 402 such that the writer process is not "aware" of the element being rendered nor is the writer process permitted to specify the element. On the contrary, the composition engine 116 may be configured to manage interaction such that the reader process is not "aware" of how the element is rendered, e.g., the opacity applied to content of the element, nor is the reader process permitted to specify how the element is rendered in this example. Thus, as illustrated the reader/writer paradigm may be used to support access to different functionality associated with the shared compositional resource to different processes.

In another example, the shared compositional resource may be configured as an animation trigger. Animation triggers may be used to trigger multiple animations from different frameworks at the same time. This may include an animation of a software keyboard with a user interface of a browser. Previously, applications were not able to notify a separate running application as to when an animation is to begin. With shared triggers, however, both the browser and soft keyboard may share the same animation trigger and activate both corresponding animations at the same time.

In a further example, the shared compositional resource 402 may be configured as a transform which may be used to modify a visual, e.g., in two dimensional or three dimensional space. For instance, a system may be configured to support responsive touch inputs. Accordingly, touch inputs may be delegated to a dedicated process that is different than a process used to specify the content that is to be affected by the touch inputs.

A writer thread, for instance, may create a shared compositional resource as a transform that is to be used to move content responsive to a touch input. A reader thread (e.g., an application) may specify the visual that is to be a subject of the movement, e.g., a cursor, gaming element, and so on. Thus, the application does not change the transform but rather specifies the visual that is to be modified by the transform. Further, "how" the visual is modified may be hidden by the writer process from the reader process. In this way, the writer process may be changed (e.g., to operate differently) without affecting the reader process.

Thus, either of the reader or writer processes may be changed in the above example without affecting execution of the other process. This abstraction may also be used to support a variety of other functionality, such as to support execution of the processes independently, use of different priorities, security levels, and so on. In this way, the processes may collaborate through use of the shared resource 402 without be bound to each other through indirect communication via the composition engine 116.

Although floats, animation triggers, and transforms were described above the shared compositional resource may be configured in a variety of other ways without departing from the spirit and scope thereof. The shared compositional resource 402, for instance, may be configured as a color in which an interface is exposed that accepts color values while another interface accepts a color element. Thus, the writer process may specify modifications to the color and the reader process may specify a visual to be modified. Other visuals are also contemplated in which a reader process is permitted to set a visual and the writer process is configured to modify one or more visual properties of the visual. In another instance, the shared compositional resource 402 is configured as a usage pattern in which a creator of the shared compositional resource 402 gets a handle to a corresponding object that is duplicated for cross process scenarios. A variety of other examples are also contemplated as further described in relation to the following procedures.

Example Procedures

The following discussion describes shared compositional resource techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
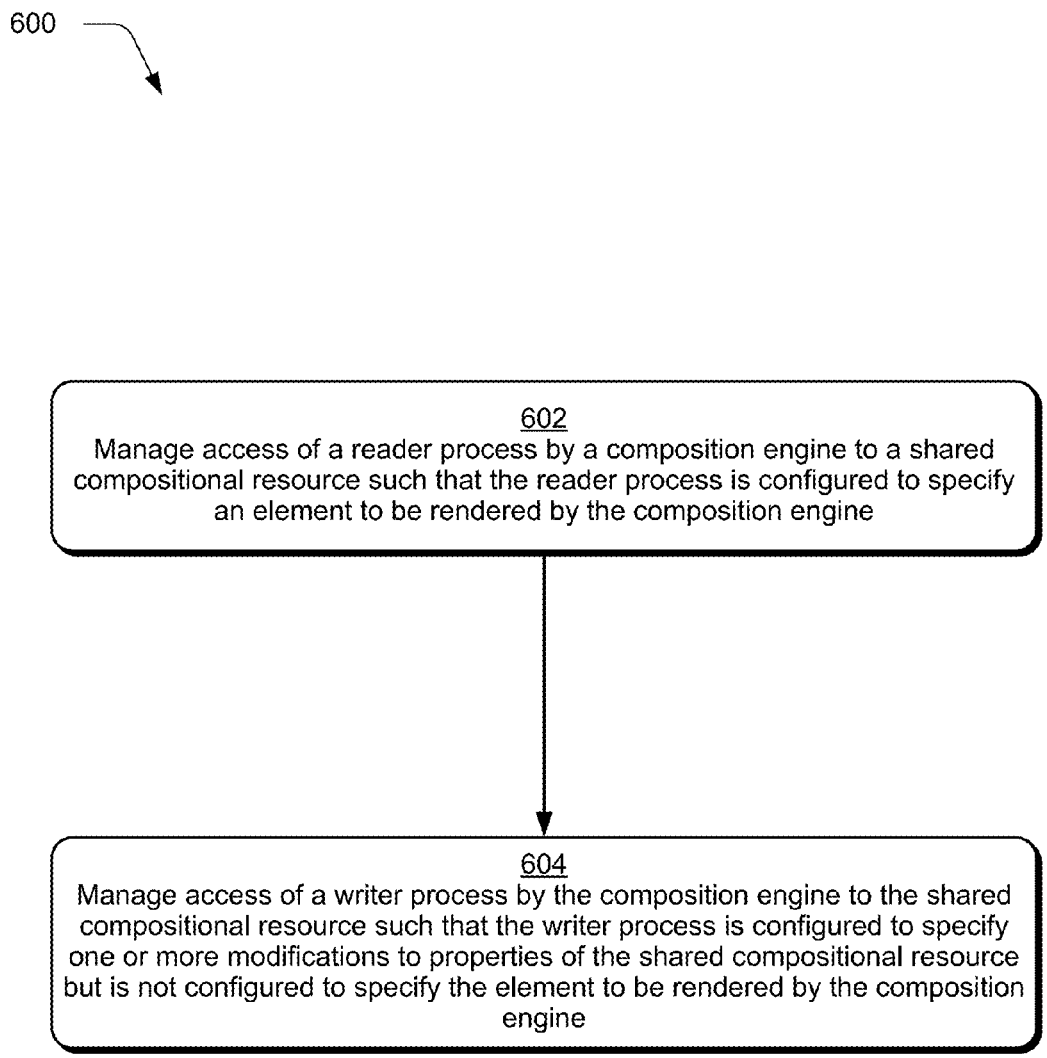
FIG. 6 is a flow diagram depicting a procedure in an example implementation in which a single composition engine manages access to a shared composition resource.

FIG. 6 depicts a procedure 600 in an example implementation in which a composition engine manages access to a shared resource. Access of a reader process is managed by a composition engine to a shared compositional resource such that the reader process is configured to specify an element to be rendered by the composition engine (block 602). The reader process, for instance, may specify child nodes in a graph 500 to the shared compositional resource 402.

Access of a writer process is managed by the composition engine to the shared compositional resource such that the writer process is configured to specify one or more modifications to properties of the shared compositional resource but is not configured to specify the element to be rendered by the composition engine (block 604). Thus, in this example the writer process is configured to modify an element but not specify the element to be modified. The reader process is configured to specify the element to be modified, but not how the modification is to be performed. In this way, a security boundary may be maintained between the processes without either process having full access to the shared compositional resource 402. A variety of other examples are also contemplated.

Example System and Device

Figure 7:
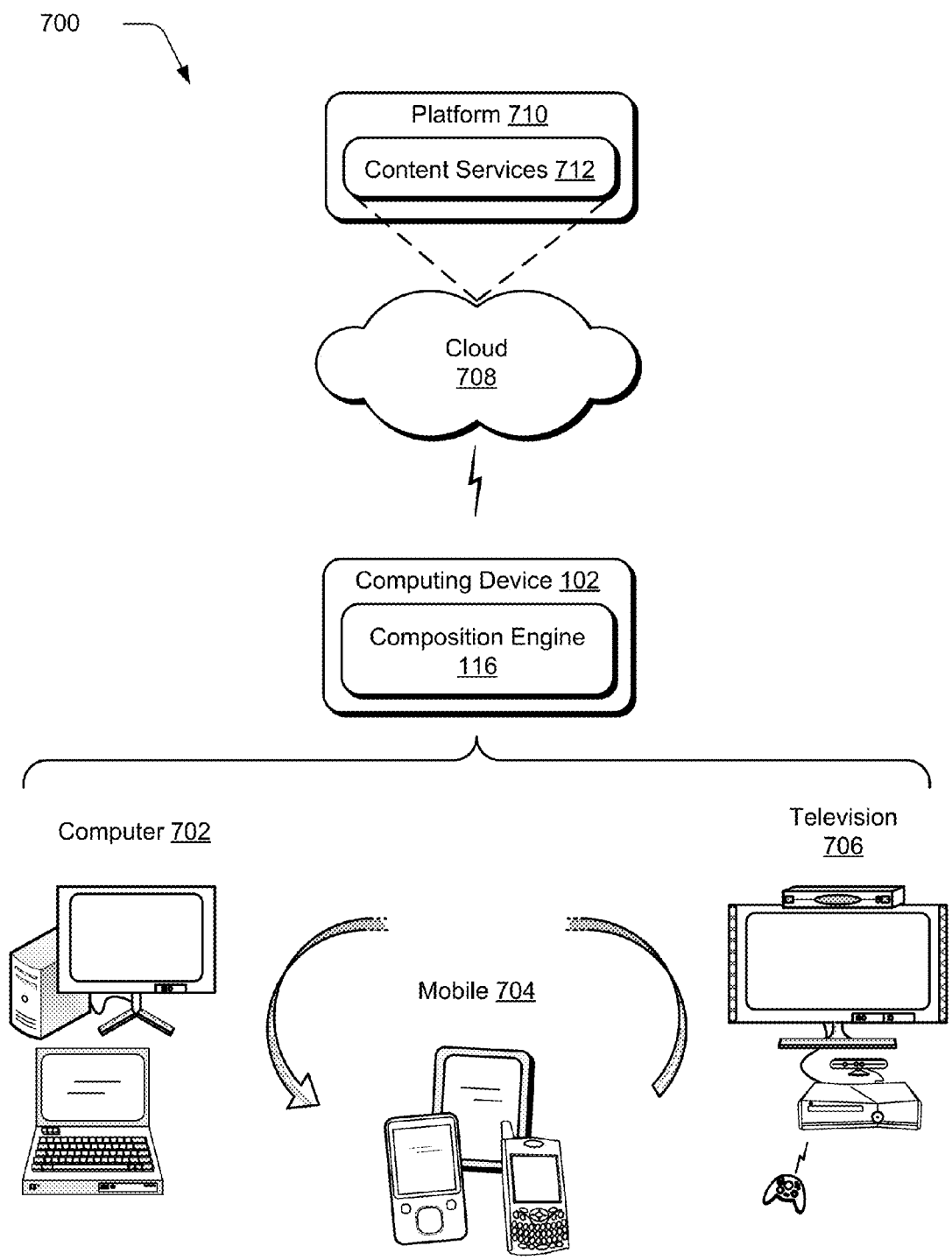
FIG. 7 illustrates an example system that includes the computing device as described with reference to FIG. 1.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality of the functionality described herein may be distributed throughout the system 700. For example, the functionality may be implemented in part on the computing device 102 as well as via the platform 710 that abstracts the functionality of the cloud 708.

Figure 8:
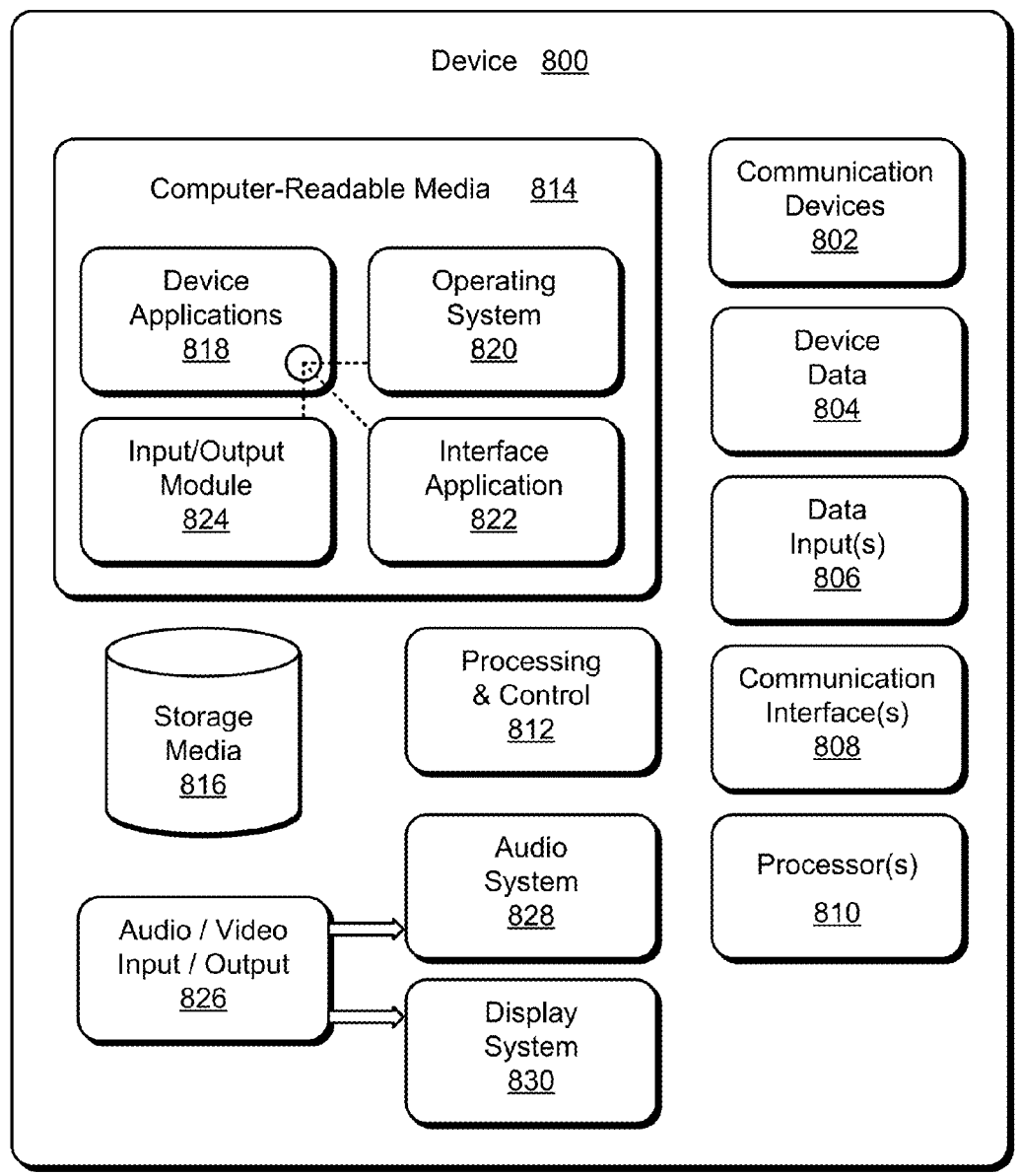
FIG. 8 illustrates various components of an example device that can be implemented as any type of computing device as described with reference to FIGS. 1-7 to implement embodiments of the techniques described herein.

FIG. 8 illustrates various components of an example device 800 that can be implemented as any type of computing device as described with reference to FIGS. 1, 2, and 7 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
one or more modules implemented at least partially in hardware, the one or more modules configured to implement a single composition engine that is configured for:
accessibility by a plurality of processes via one or more application programming interfaces to render elements for display on a display device; and
managing sharing of a shared compositional resource by the plurality of processes, the shared compositional resource involved in the rendering of the elements,
wherein the shared compositional resource follows a reader/writer paradigm managed by the single composition engine for access by the plurality of processes such that a reader process is configured to specify what element is displayed and a writer process is configured to create the shared compositional resource and to specify how the specified element is displayed, the writer process lacks permission to specify the element, the reader process lacks permission to specify how the specified element is displayed, the reader and writer processes included in the plurality of processes.

2. A system as described in claim 1, wherein the shared compositional resource include a float, color, animation trigger, transform visual, or other visual property.

3. A system as described in claim 1, wherein the single composition engine is executed in kernel mode and the plurality of processes are executed in user mode.

4. A system as described in claim 3, wherein the shared compositional resource is managed by the single composition engine such that the writer process is not aware of what element is displayed and the reader process is not aware as to how the specified element is displayed.

5. A system as described in claim 1, wherein the shared compositional resource is included in a graph to follow a reader/writer paradigm managed by the single composition engine for access by the plurality of processes such that a reader process is configured to associate one or more child nodes that specify content to the shared compositional resource in the graph and a writer process is configured to modify one or more visual properties of the content but lacks permission to add child nodes to the shared compositional resource.

6. A system as described in claim 5, wherein the graph is a global composition tree.

7. A system as described in claim 1, wherein each of the plurality of processes corresponds to respective ones of a plurality of applications.

8. A system as described in claim 1, wherein the one or more modules are implemented at least in part through execution of an operating system.

9. A system as described in claim 1, wherein the single composition engine is accessible to the plurality of processes via a web service.

10. A system as described in claim 1, wherein the single composition engine is further configured to determine that one of the elements is occluded by another of the elements and not render the one of the elements.

11. A method implemented by one or more computing devices, the method comprising:
managing access of a reader process by a composition engine to a shared compositional resource such that the reader process is configured to specify an element to be rendered by the composition engine as part of the shared compositional resource; and
managing access of a writer process by the composition engine to the shared compositional resource such that the writer process is configured create the shared compositional resource and to specify one or more modifications to properties of the shared compositional resource but lacks permission to specify the element to be rendered by the composition engine as part of the shared compositional resource, wherein the reader process lacks permission to specify the one or more modifications to the properties.

12. A method as described in claim 11, wherein the one or more modifications by the writer process specify how the element is to be rendered by the composition engine.

13. A computer readable storage memory comprising instructions stored thereon that, responsive to execution by a computing device, causes the computing device to implement a single composition engine that is accessible by a plurality of processes via one or more application programming interfaces to render elements specified in a graph for display by a display device, the graph having a shared compositional resource that is accessible by each of the plurality of processes, wherein the shared compositional resource follows a reader/writer paradigm managed by the single composition engine for access by the plurality of processes such that a reader process is configured to specify what element is displayed and a writer process is configured to create the shared compositional resource and to specify how the specified element is displayed, the writer process lacks permission to specify the element, the reader process lacks permission to specify how the specified element is displayed.

14. A computer readable storage memory as described in claim 13, wherein the single composition engine is executed in kernel mode and the plurality of processes are executed in user mode.

15. A computer readable storage memory as described in claim 14, wherein the shared compositional resources are managed by the single composition engine such that the writer process is not aware of what element is displayed and the reader process is not aware as to how the specified element is displayed.

16. A computer readable storage memory as described in claim 13, wherein the shared compositional resource follows the reader/writer paradigm managed by the single composition engine such that the reader process is configured to associate one or more child nodes that specify content to the shared compositional resource in the graph and the writer process is configured to modify one or more visual properties of the content but lacks permission to add child nodes to the shared compositional resource.

17. A computer readable storage memory as described in claim 13, wherein the graph is a global composition tree.

* * * * *